J. W. ASHWORTH.
PORTABLE ELEVATOR.
APPLICATION FILED NOV. 4, 1909.
1,048,124.
Patented Dec. 24, 1912.
6 SHEETS—SHEET 2.
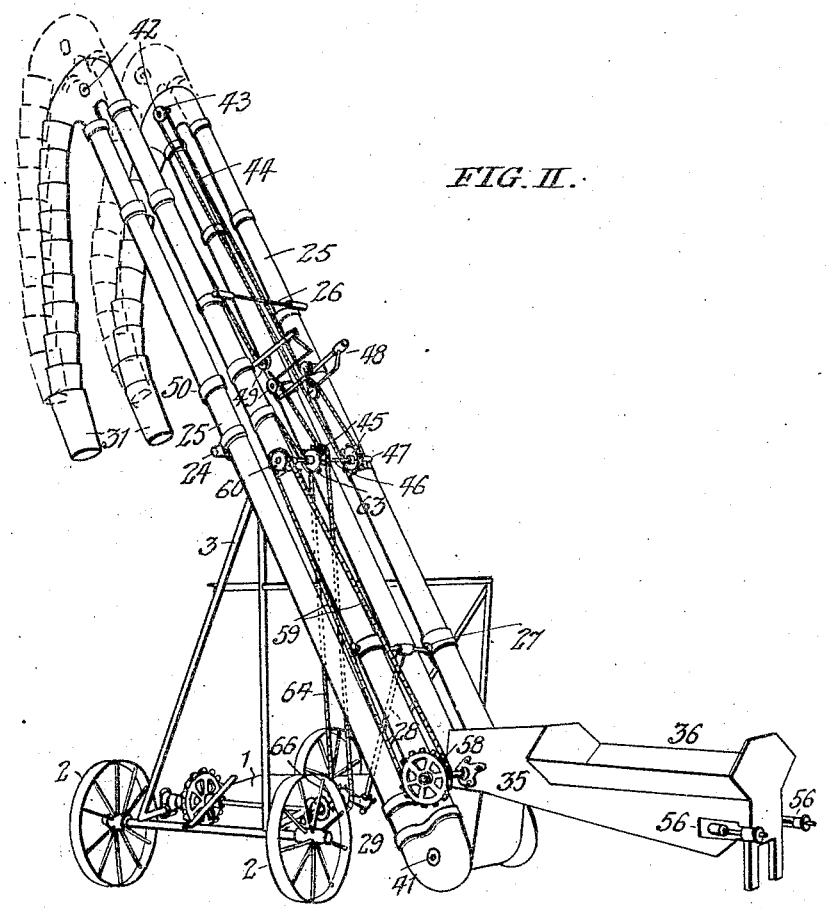
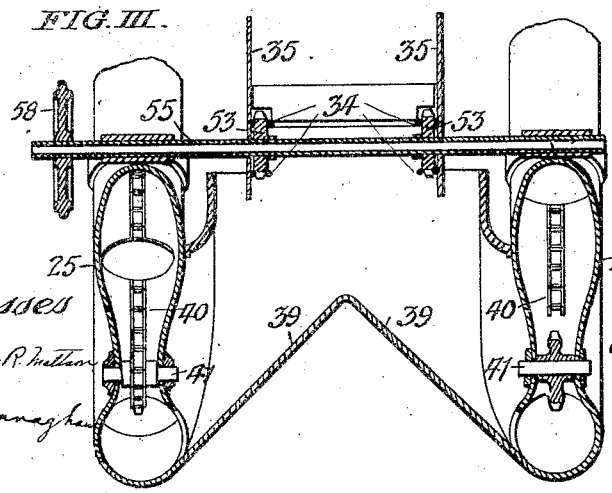

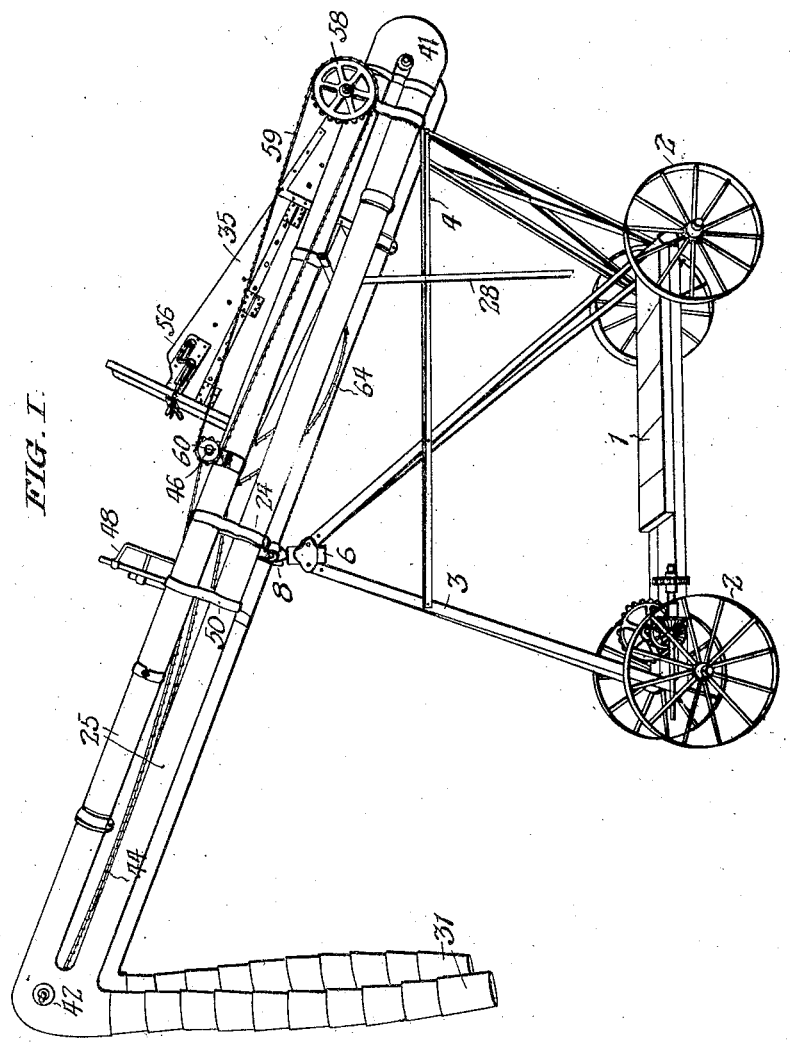

J. W. ASHWORTH.
PORTABLE ELEVATOR.
APPLICATION FILED NOV. 4, 1909.
1,048,124.
Patented Dec. 24, 1912.
6 SHEETS—SHEET 3.
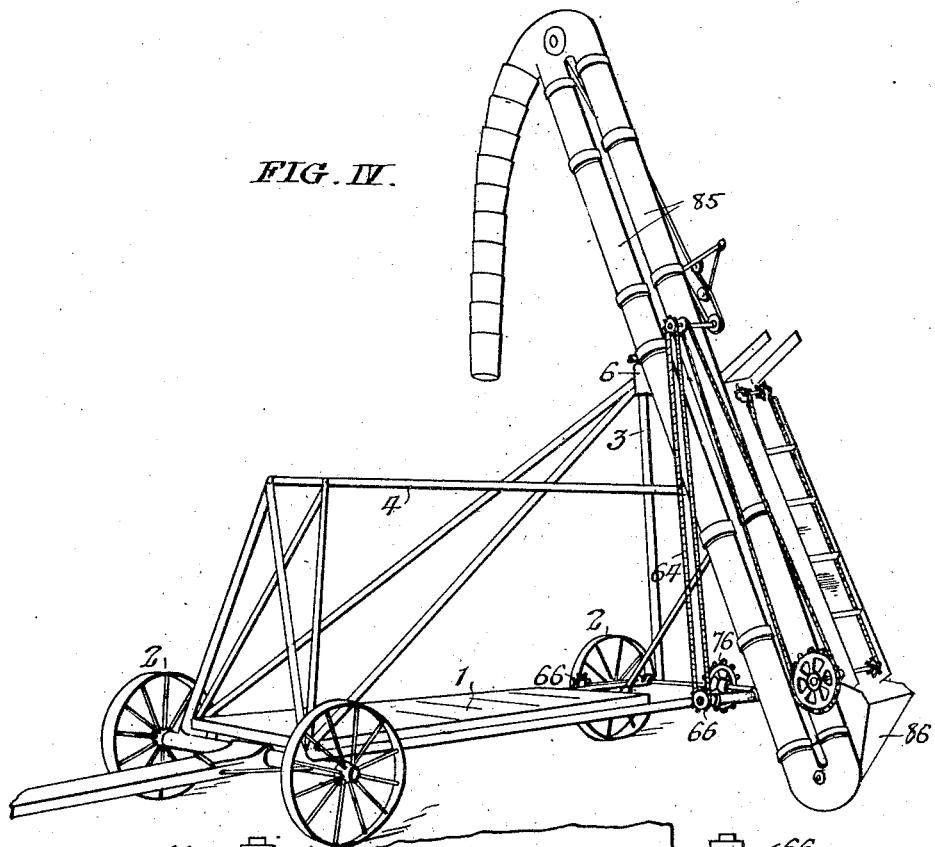
FIG. IV.
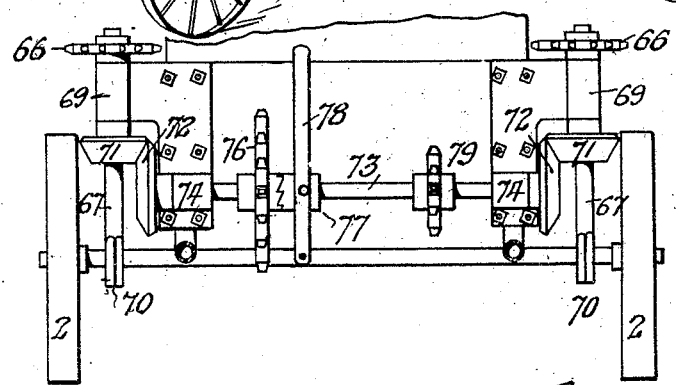
FIG. V.
Witnesses
Gertrude N. P. Mattison.
Mary O. Gavaghan.
Inventor
John William Ashworth,
By Arthur E. Paige
Atty.

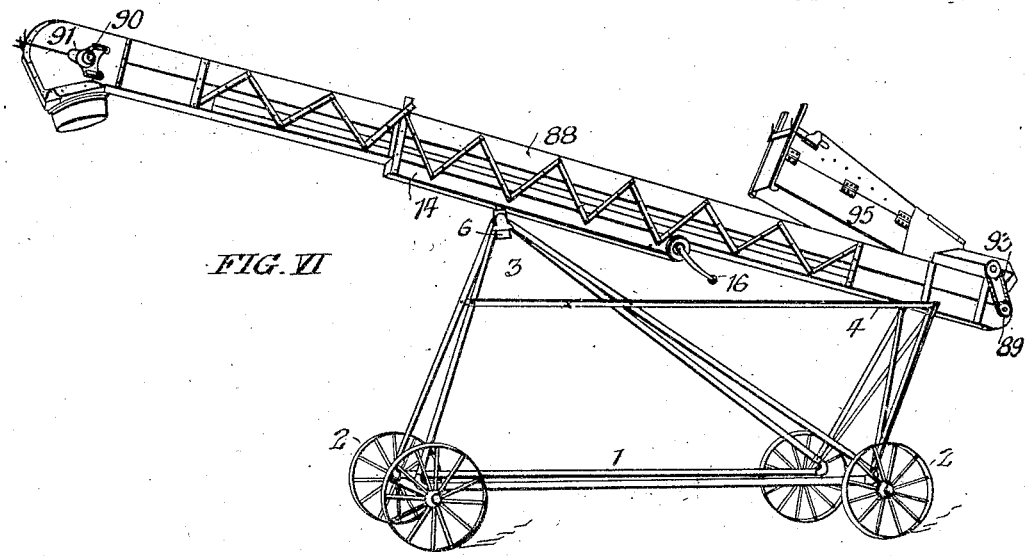
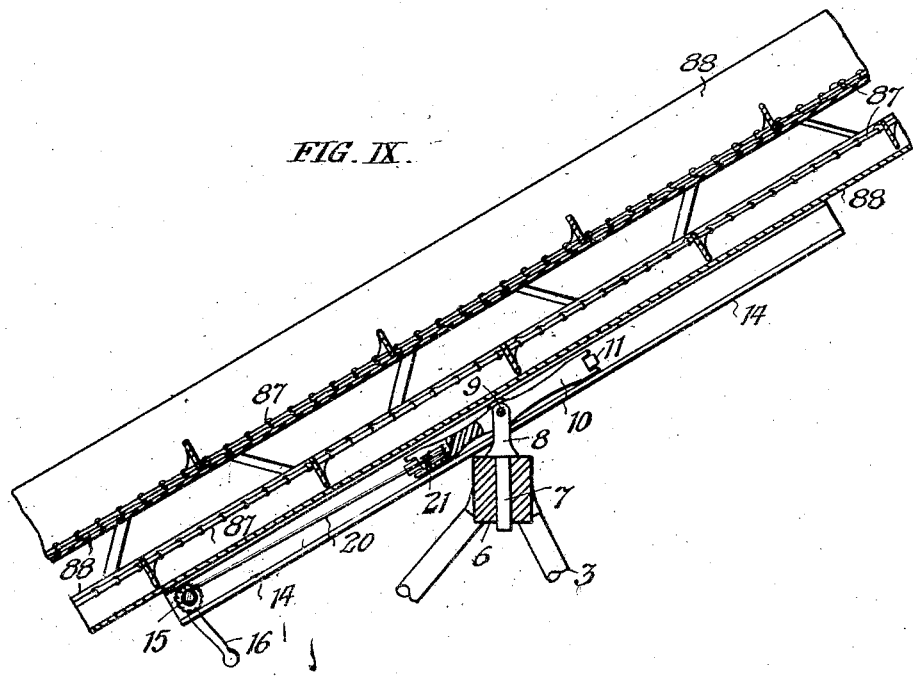

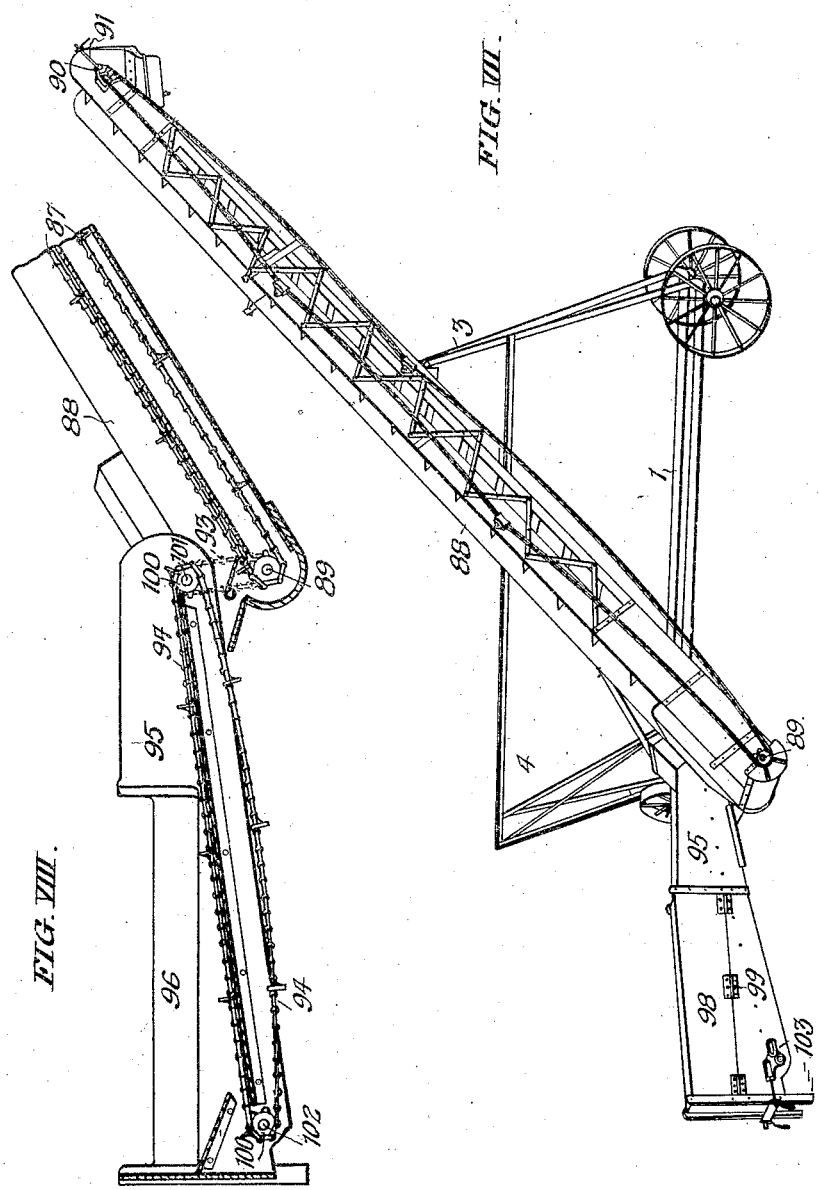

J. W. ASHWORTH.
PORTABLE ELEVATOR.
APPLICATION FILED NOV. 4, 1909.
1,048,124.
Patented Dec. 24, 1912.
6 SHEETS—SHEET 6.
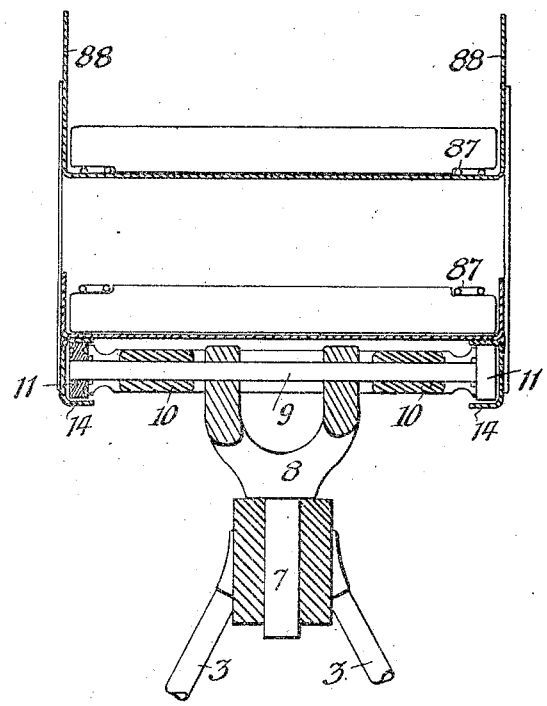
FIG. X.
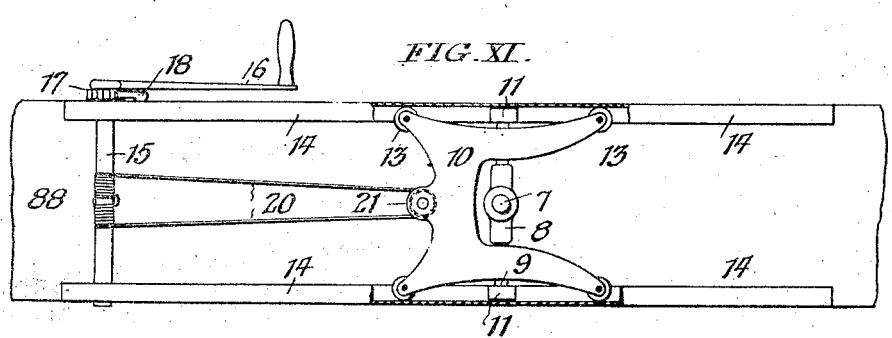
FIG. XI.
WITNESSES
INVENTOR
John William Ashworth,
BY
ATTY

UNITED STATES PATENT OFFICE.

JOHN WILLIAM ASHWORTH, OF PHILADELPHIA, PENNSYLVANIA.

PORTABLE ELEVATOR.

1,048,124.  Specification of Letters Patent.  Patented Dec. 24, 1912.

Application filed November 4, 1909. Serial No. 526,179.

*To all whom it may concern:*

Be it known that I, JOHN WILLIAM ASHWORTH, of Philadelphia, in the State of Pennsylvania, have invented a certain new and useful Improvements in Portable Elevators, whereof the following is a specification, reference being had to the accompanying drawings.

My improvement is particularly adapted to receive grain from an ordinary wagon and convey it into a railroad car, although, of course not limited to such use.

As hereinafter described, my invention includes a truck having supporting wheels upon which it may be transported, and including a standard provided at its top with a swivel connection arranged to support an elevator including an endless belt and a casing for the same, having at its outlet end an adjustable discharge chute and pivotally connected at its inlet end with a feeding conveyer, including an endless belt, a casing and a hopper for the same. Said standard is connected with said truck by a cradle frame arranged to support said conveyer and elevator when folded thereon for transportation; and said truck is provided with chain driving mechanism operatively connected with said endless belt.

My invention includes means for longitudinally adjusting said elevator with respect to its swivel connection with said truck, and, the various novel features of construction and arrangement hereinafter described.

In the drawings:—Figure I is a perspective view of an elevator conveniently embodying my improvement and including a double tubular casing elevator and feeding conveyer folded for transportation. Fig. II is a perspective view showing said elevator arranged for operation. Fig. III is a fragmentary transverse sectional view of the form of feeding conveyer and elevator boot shown in Figs. I and II. Fig. IV is a perspective view of a modified form of my invention including a single tubular casing conveyer. Fig. V is a fragmentary plan view showing the chain driving mechanism carried by the truck. Fig. VI is a perspective view showing a modified form of my invention including a conveyer with an open casing folded for transportation. Fig. VII is a perspective view of the form of my invention shown in Fig. VI, but arranged for operation. Fig. VIII is a longitudinal sectional view of the boot and a portion of the conveyer indicated in Figs. VI and VII. Fig. IX is a fragmentary longitudinal sectional view of the conveyer showing its adjustable pivotal connection with the truck standard. Fig. X is a transverse sectional view of the conveyer and its pivotal support as shown in Fig. IX. Fig. XI is an inverted fragmentary sectional view of the adjustable pivotal connection shown in Figs. IX and X.

The truck comprises the body frame 1 provided with the supporting wheels 2 and having the standard 3 connected with said frame 1 by the cradle frame 4. Said standard 3 is provided at its top with the bearing 6 for the swivel connection which as shown in Figs. IX, X and XI includes the shaft 7 mounted to turn in said bearing 6 and having the yoke 8 carrying the shaft 9 extending through the roller frame 10 and having the rollers 11 at the opposite ends of said shaft 9 upon which the elevator is tiltably supported. Said roller frame 10 is provided with the rollers 13 which with the rollers 11 are arranged to traverse the channels 14 which are attached to the bottom of the conveyer which may be longitudinally adjusted with respect to said pivotal connection by means of the crank shaft 15 having the operating handle 16 and ratchet wheel 17 in operative relation with the spring pressed pawl 18; said shaft 15 being operatively connected with said roller frame 10 by the flexible connector 20 which extends around the sheave 21 on said frame 10 and has its opposite ends wrapped upon said shaft 15. It is to be understood with reference to Fig. IX that the elevator may be lowered longitudinally with respect to said pivotal connection to the extent determined by said flexible connector 20 and may be longitudinally shifted in either direction by rotation of said shaft 15. Of course, such adjustment of the elevator is limited by the length of the chain 64, and is so effected as to leave said chain in operative relation with the sprocket wheels at the opposite ends thereof regardless of the angular position of the elevator.

In the form of my invention shown in Figs. I and II the swivel shaft 7 depends from the yoke frame 24 which rigidly connects the parallel tubular casings 25 of the double conveyer including two pairs of tubes, also rigidly cross connected by the bars 26 and 27, the latter carrying the strut 28, whereby the conveyer may be braced in adjusted position in connection with the bracket 29 extending from the truck body frame 1. Said double tubular casing conveyer shown in Figs. I and II is provided at its upper end with adjustable discharging chutes 31 and is pivotally connected at its lower inlet end with the feeding conveyer shown in section in Fig. III including the endless belt 34 in the casing 35 having the hopper 36 to receive the material which is conveyed by said belt 34 from said casing 35 into the oppositely inclined ports 39 of the elevator boot communicating with the respective tubular casings 25 containing the endless belts 40 whose opposite parallel flights are supported at the ends of said tubes 25 by sprocket wheels having respective shafts 41 and 42. Said shafts 42 are provided with sprocket wheels 43 for connection with the driving chains 44, which are operated by the sprocket wheels 45 on the counter-shaft 46 journaled in bearings 47 on the conveyer tubes 25. Said driving belts 44 are conveniently provided with tightening devices including brackets 48 provided with the sheaves 49 supported by the yoke 50.

As shown in Fig. III the endless belt 34 is supported at its junction with the elevator boot by the sprocket wheels 53 upon the shaft 55; the opposite end of said casing 35 being provided with a similar shaft and sprocket wheels adjustably supported in the bearings 56. Said shaft 53 is provided exterior to said casing 35 with the sprocket wheel 58 by which said chain 34 is driven. As shown in Fig. II said sprocket wheel 58 is connected by the chain 59 with the sprocket wheel 60 on the said counter-shaft 46. Said shaft 46 has the sprocket wheel 63 connected by the chain 64 with the sprocket wheel 66 of the chain driving mechanism carried by the truck body frame 1.

As shown in Fig. V the chain driving mechanism carried by the truck frame 1 includes opposite counterpart chain wheels 66 on respective counter shafts 67 journaled in bearings 69 and having their opposite ends 70 squared or otherwise fitted to be turned by a crank or other convenient means. Moreover, said shafts 67 are provided with beveled gears 71 in mesh with beveled gears 72 carried by the main shaft 73 supported in the bearing 74 on said truck body frame 1; said shaft 73 carries the driving sprocket wheel 76 for operative connection with a motor. Said wheel 76 is loose on said shaft 73, but may be operatively connected therewith by the clutch 77 controlled by the hand lever 78; said shaft 73 is also provided with the sprocket wheel 79 and it is to be understood that either of said sprocket wheels 66 or 79 shown in Fig. V may be operatively connected with the chain 64 shown in Fig. II in accordance with the position of the conveyer in relation to the truck.

The form of my invention shown in Fig. IV is similar to that above described but is simplified in that the conveyer includes but a single pair of tubes 85 connected with a boot 86 upon one side thereof.

The form of my invention shown in Figs. VI, VII and VIII includes a single conveyer having the endless belt 87 extending in the open casing 88 and supported at the opposite ends thereof upon the shafts 89 and 90, the latter being provided with adjustable bearings 91. Said endless belt 87 is operatively connected by the chain 93 with the endless belt 94 extending in the boot comprising the casing 95 having the hopper 96 which is conveniently formed as indicated in Fig. VII by movable leaves 98 connected with said casing 95 by the hinges 99. Said belt 94 is supported at its opposite ends by the sprocket wheel 100 respectively supported by the shafts 101 and 102 the latter being provided with the adjustable bearings 103 indicated in Fig. VII.

I do not desire to limit myself to the precise details of construction and arrangement herein set forth as it is obvious that various modifications may be made therein without departing from the essential features of my invention as defined in the appended claims.

I claim:—

1. In a portable elevator, the combination with a truck provided with supporting wheels and a standard; of a conveyer pivotally connected, intermediate of its length, with said standard and including an endless belt; means arranged to drive said conveyer belt, including a main shaft on said truck having a driving wheel, a clutch arranged to connect and disconnect said wheel on said shaft, and a counter shaft having a driving sprocket; and, means, including a chain, operatively connecting said driving sprocket with said endless belt.

2. In a portable elevator, the combination with a truck provided with supporting wheels and a standard; of a conveyer pivotally connected, intermediate of its length, with said standard and including an endless belt; means arranged to drive said conveyer belt, including a main shaft on said truck provided with a driving wheel, a clutch arranged to connect and disconnect said wheel with said shaft, and opposite counter shafts extending transversely with respect to said driving shaft and connected therewith, each having a driving sprocket; and, means, including a chain, operatively connecting one of said driving sprockets with said endless belt.

3. In a portable elevator, the combination with a truck provided with supporting wheels and a standard; of a conveyer pivotally connected with said standard and including an endless belt; means arranged to drive said conveyer belt, including a shaft on said truck having a driving wheel, a clutch arranged to connect and disconnect said wheel on said shaft, and counterpart shafts extending transversely with respect to said driving shaft and connected therewith by beveled gears; each of said transverse shafts being fitted for engagement with rotating means and carrying a sprocket wheel; a chain operatively connecting said driving mechanism on the truck with said endless belt; and, means arranged to shift said conveyer longitudinally with respect to its connection with said truck.

4. In a portable elevator, the combination with a truck having supporting wheels; of a standard carried by said truck having a bearing at its top; a pivotal connection including a vertical shaft journaled in said bearing and carrying a yoke; a horizontal shaft extending through said yoke and having rollers at its opposite ends; a roller frame carried by said horizontal shaft, provided with rollers on vertical axes; channels in which said rollers are fitted to traverse; a conveyer carried by said channels; and means arranged to adjust said conveyer longitudinally with respect to said roller frame, comprising a rotary shaft carried by said conveyer; means to rotate it; and, a flexible connector between said shaft and roller frame.

5. In a portable elevator, the combination with a truck provided with supporting wheels and a standard; of a conveyer including double parallel casings with a boot having oppositely inclined inlet ports and pivotally connected with said standard and including respective parallel endless belts; means arranged to drive said conveyer belts including a shaft on said truck provided with a driving wheel, and a chain operatively connecting said driving mechanism on the truck with said endless belts; a feeding conveyer at the inlet end of said conveyer; and an endless belt in said feeding conveyer, arranged to deliver material between said conveyer casings into said oppositely inclined ports.

6. In a portable elevator, the combination with a truck having supporting wheels; of a standard carried by said truck; a conveyer pivotally connected, intermediate of its length, with said standard and including an endless belt; and, means arranged to drive said conveyer belt, including shafts on said truck extending horizontally transversely with respect to each other and carrying sprocket wheels, and, means including a chain adapted to operatively connect said conveyer belt with either of said transversely related shafts, in accordance with the rotary position of said conveyer with respect to said truck.

7. In a portable elevator, the combination with a truck provided with supporting wheels and a standard; of an elevator conveyer pivotally connected, intermediate of its length, with said standard to tilt vertically and rotate horizontally with respect to said truck; means arranged to drive said conveyer belt, including shafts provided with sprockets extending transversely to each other on said truck; and, means including a chain adapted to operatively connect said conveyer belt with either of said transversely related shafts, in accordance with the rotary position of said conveyer with respect to said truck.

8. In a portable elevator, the combination with a truck provided with supporting wheels and a standard; of an endless belt conveyer having means pivotally connecting it with said standard whereby it may be swung vertically and horizontally; means arranged to drive said conveyer belt, including a main shaft on said truck having a driving wheel, a clutch arranged to connect and disconnect said wheel on said shaft, and a counter shaft having a driving sprocket; and, means, including a chain, operatively connecting said driving sprocket with said endless belt.

9. In a portable elevator, the combination with a truck provided with supporting wheels and a standard; of a conveyer pivotally connected with said standard and including an endless belt; means arranged to drive said conveyer belt, including a shaft on said truck having a driving wheel, a clutch arranged to connect and disconnect said wheel on said shaft, and counterpart shafts extending transversely with respect to said driving shaft and connected therewith by beveled gears; each of said transverse shafts being fitted for engagement with rotating means and carrying a sprocket wheel; and, a chain operatively connecting said driving mechanism on the truck with said endless belt.

In testimony whereof I have hereunto signed my name at Philadelphia, Pennsylvania, this third day of November, 1909.

JOHN WILLIAM ASHWORTH.

Witnesses:
ARTHUR E. PAIGE,
GERTRUDE N. R. MATTSON.